United States Patent [19]

Pandya et al.

[11] 4,382,590
[45] May 10, 1983

[54] PLATE CUTTING FRAME

[76] Inventors: Mahendra K. Pandya, 8018 Daytona, NW., Massillon, Ohio 44646; Manuel G. Vega, 1930 Otterbin St., Louisville, Ohio 44641

[21] Appl. No.: 234,024

[22] Filed: Feb. 12, 1981

[51] Int. Cl.³ .............................................. B26D 7/01
[52] U.S. Cl. ................................. 269/87.2; 33/32 B; 83/455; 83/565; 269/288
[58] Field of Search ................. 83/455, 565, 743, 745; 33/32 R, 32 B, 32 G, 482, 41 R, 41 F; 269/87.2, 269/288, 385

[56] References Cited

U.S. PATENT DOCUMENTS

| | | | |
|---|---|---|---|
| 778,233 | 12/1904 | Enyart | 269/87.2 |
| 1,799,374 | 4/1931 | Hurley | 269/305 X |
| 2,559,434 | 7/1951 | Hyland | 83/455 X |
| 2,589,525 | 3/1952 | Absher | 33/482 |
| 2,764,239 | 9/1956 | Selby, Sr. | 269/305 X |
| 3,199,860 | 8/1965 | Moberg | 269/87.2 |
| 3,576,148 | 4/1971 | Katz | 269/87.2 X |
| 3,787,968 | 1/1974 | Littmann | 83/565 X |
| 4,170,065 | 10/1979 | Hiscott | 33/482 X |

Primary Examiner—Frank T. Yost
Attorney, Agent, or Firm—Frease & Bishop

[57] ABSTRACT

A device for holding and cutting a thin plate of sheet material such as glass or plastic into a plurality of smaller rectangular plates with a hand-manipulated tool. A rigid base is formed with a recess which forms a depressed platform for receiving and firmly holding a plate therein. A pair of spaced posts are mounted on the base and are located at opposite sides from each other. A template is removably mounted on the base by the posts which extend into a selected pair of a plurality of holes formed in the template. A plurality of spaced, linearly extending grooves are formed in the template for guiding a cutting tool in a straight line when cutting the plate which is mounted between the base and template. The template is rotated 90° and repositioned on the base posts after the plate is cut in a first direction by the cutting tool which is moved along one or more of the template grooves, whereby the template grooves then form guides for cutting the plate in a transverse direction with respect to the previous plate cuts. Selection of the appropriate grooves determines the size of the smaller plate or plates cut from the main plate.

14 Claims, 12 Drawing Figures

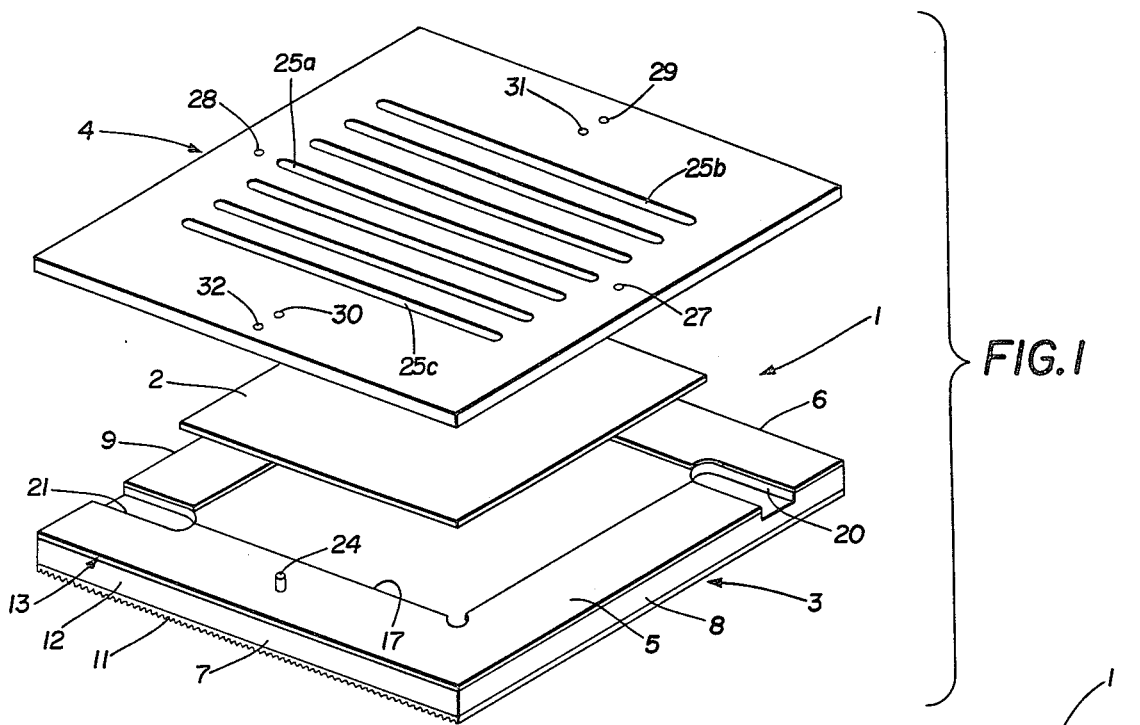
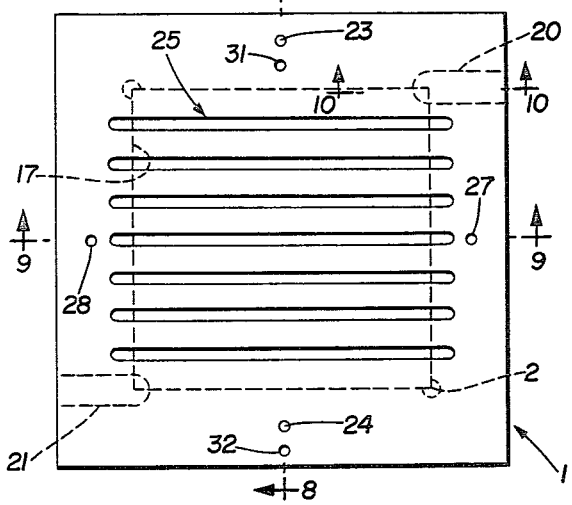
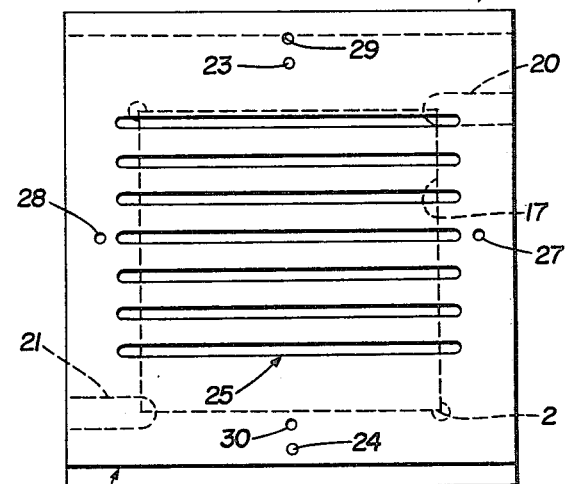
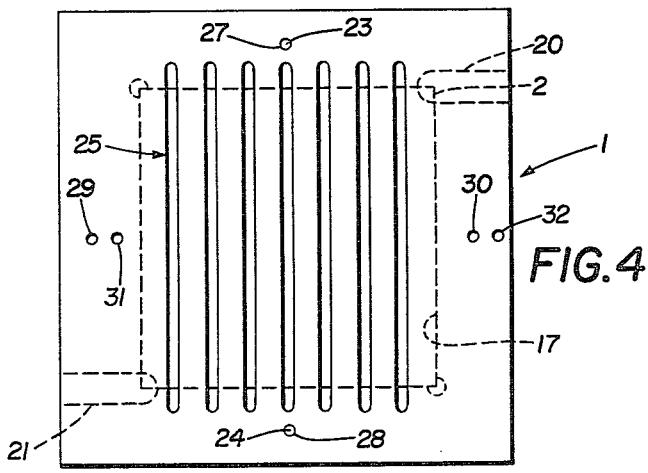
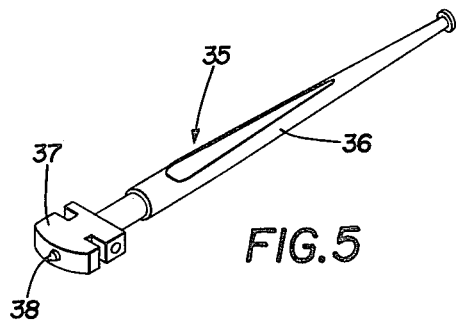

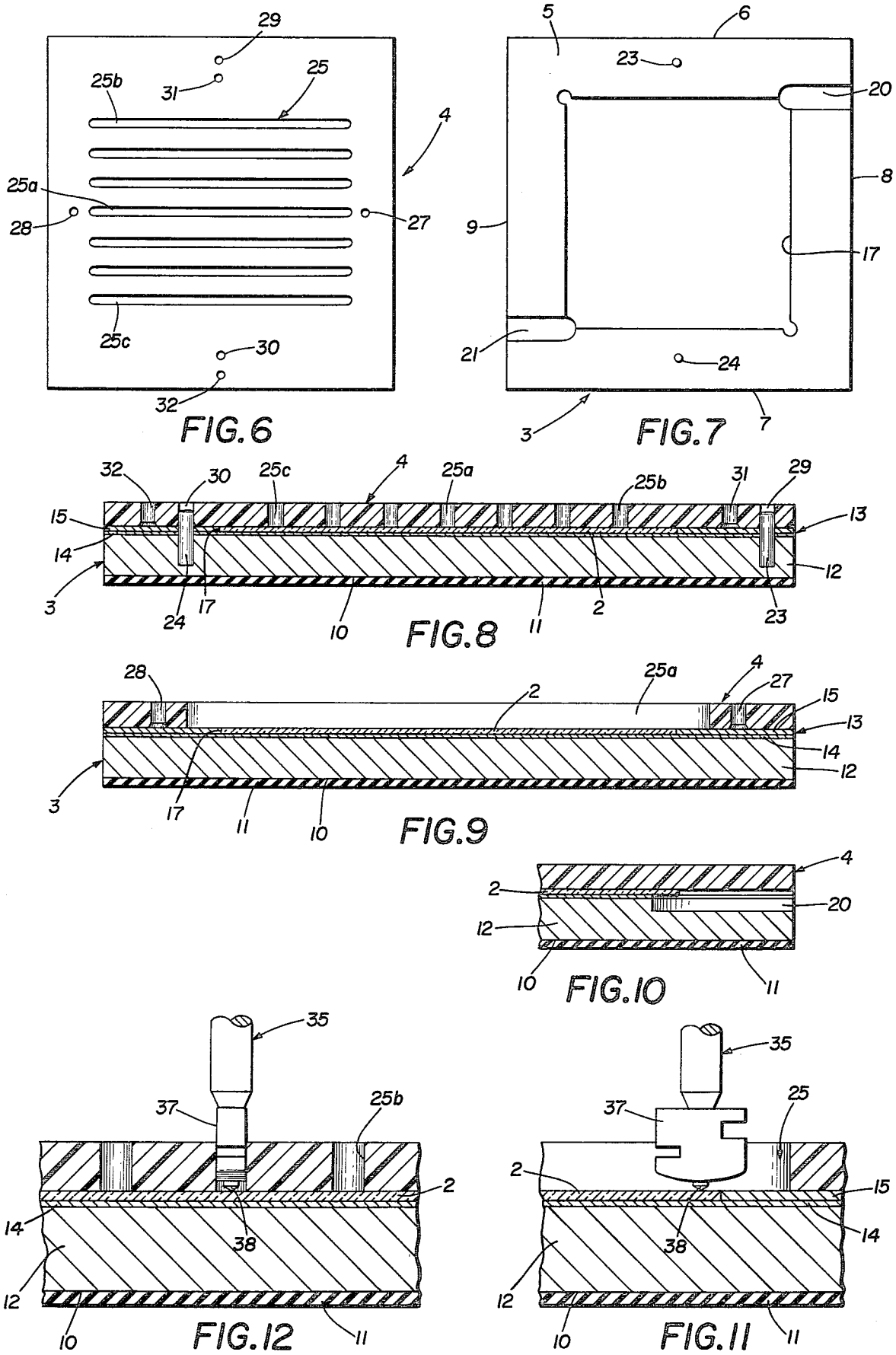

PLATE CUTTING FRAME

BACKGROUND OF THE INVENTION

1. Field of the Invention

The invention relates to a frame construction for holding a thin plate of material which is cut into a plurality of smaller plates by a manually manipulated cutting tool. More particularly, the invention relates to a frame for holding a thin plate between a base and template in which the template is formed with a plurality of grooves for guiding the cutting tool during a cutting operation, and in which the template is removably mounted on the base for cutting the plate in both horizontal and vertical directions to form the smaller plates.

2. Description of the Prior Art

When performing analysis of various organic compounds in a process referred to as Thin Layer Chromatography (TLC), a sample of a mixture to be analyzed is placed on thin glass plate. The mixture sample separates on the plate for subsequent analysis of the organic compounds which form the mixture. The plates which are used in TLC are generally rectangularly shaped and are available in numerous sizes. Both the lengths and widths of these plates vary throughout a wide range to provide the various size plates required by laboratories in performing the separation and analysis procedures. The particular size plate which is used depends upon the particular material being separated. This requires the analysis laboratories to stock a considerable number of such plates of various sizes, which presents inventory and stocking problems.

These presized plates are relatively expensive with respect to the price of a large size plate of the required sheet material. Therefore, it is extremely advantageous for the laboratories or other users of the TLC plates to obtain relatively large sheets or plates of the material and cut the plates themselves into the smaller sized plates as required for a particular analysis or when the inventory of a particular size plate drops below a predetermined amount.

No known frame or cutting device of which we are aware enables these TLC plates or other types of glass, plastic or similar material plates, to be easily and conveniently cut into smaller sizes. Therefore, the need has existed for a plate cutting frame which securely holds a main plate, enabling the plate to be cut into a number of different size smaller plates particularly for use in TLC analysis by a simple and inexpensive manually operated cutting tool.

SUMMARY OF THE INVENTION

Objectives of the invention include providing a plate cutting frame which securely holds a large plate of material in a fixed position for cutting the plate into a plurality of smaller size plates by a manually manipulated tool; and in which the cutting tool is moved in a first horizontal direction along a preselected guide channel formed in a template which is placed over the plate being cut, and then moved in a second vertical direction which is transverse to the previously cut horizontal direction after the template has been rotated 90° on the base of the cutting frame.

Another object is to provide such a cutting frame in which a recess is formed in the base for receivably mounting and securely holding the large plate in a fixed position for cutting the same; in which the template is formed with three pairs of mounting holes into which a pair of posts mounted on the frame base is selectively inserted for positioning the template in the horizontal and vertical cutting positions on the base; and in which one of the pairs of template holes permits adjustment of the guide grooves with respect to the plate being cut to increase the number of size plates which may be cut from the single large plate.

Still another object is to provide such a cutting frame in which the base can be formed of numerous types of materials such as plastic, wood, metal or other rigid material, and in which a rubber or skid-resistant material is mounted on the bottom of the base to prevent slippage of the cutting frame during a cutting operation.

A further object is to provide such a cutting frame in which the template preferably is formed of a clear, rigid plastic material enabling a user to view the plate being cut at all times during a cutting operation, and in which the template guide grooves preferably have a width complementary to the width of the cutting end of the cutting tool used with the cutting frame whereby the point of the tool cuts a continuous straight line in the large plate to eliminate wobble or sideways movement of the tool during a cutting operation.

Another object is to provide such a cutting frame which is of an extremely simple, rugged and inexpensive construction which achieves the stated objectives efficiently and effectively, and which satisfies needs and obtains new results in the art.

These objectives and advantages are obtained by the plate cutting frame of the invention which is used for cutting a thin main plate of material into a plurality of smaller size plates, the general nature of which may be stated as including base means for holding a main plate in a fixed position; a template removably mounted on the base means and adapted to overlie a main plate when held on the base means; a plurality of spaced, linear guide grooves formed in the template, said grooves being adapted to slidably receive the end of a cutting tool therein for cutting a main plate in a line along a selected guide groove; and mounting means formed on the base means and template for mounting the template on the base means in a first cutting position in which the guide grooves extend in a first direction and in a second cutting position in which the guide grooves extend in a second direction transverse to said first direction, whereby a cutting tool when moved along certain selected guide grooves in the template first position and then moved along certain selected guide grooves in the template second position cuts a predetermined sized smaller plate from the main plate.

BRIEF DESCRIPTION OF THE DRAWINGS

A preferred embodiment of the invention—illustrative of the best mode in which applicants have contemplated applying the principle—is set forth in the following description and shown in the accompanying drawings, and is particularly and distinctly pointed out and set forth in the appended claims.

FIG. 1 is an exploded perspective view of the plate cutting frame including a plate to be cut therein;

FIG. 2 is a top plan view of the plate cutting frame of FIG. 1 in an assembled state with the plate being mounted therein;

FIG. 3 is a view similar to FIG. 2 with the template component being shown mounted on the base component in an adjusted cutting position from that of FIG. 2;

FIG. 4 is a top plan view similar to FIGS. 2 and 3 with the template being in a plate cutting position rotated 90° with respect to the plate cutting position of FIGS. 2 and 3;

FIG. 5 is a perspective view of a type of cutting tool which may be used with the plate cutting frame of FIGS. 1–4;

FIG. 6 is a top plan view of the template component of the plate cutting frame;

FIG. 7 is a top plan view of the base component of the plate cutting frame;

FIG. 8 is an enlarged sectional view taken on line 8—8, FIG. 2;

FIG. 9 is an enlarged sectional view taken on line 9—9, FIG. 2;

FIG. 10 is an enlarged fragmentary sectional view taken on line 10—10, FIG. 2;

FIG. 11 is an enlarged sectional view of a portion of FIG. 9 showing a cutting tool inserted in one of the template guide grooves and engaged with a plate mounted between the base and template; and FIG. 12 is an enlarged sectional view of a portion of FIG. 8 showing a cutting tool inserted in one of the template guide grooves and engaged with the plate.

Similar numerals refer to similar parts throughout the drawings.

DESCRIPTION OF THE PREFERRED EMBODIMENT

The plate cutting frame of the invention is indicated generally at 1, and is shown in FIG. 1 in an exploded condition. A thin plate of sheet material 2 of the type to be mounted within and cut by frame 1 is illustrated in FIG. 1. Frame 1 includes as its main components a base indicated generally at 3 (FIG. 7) and a template indicated generally at 4 (FIG. 6). Base 3 is formed of a generally flat rigid member, preferably rectangular in shape, having a top surface 5 and parallel side surfaces 6 and 7 and end surfaces 8 and 9. The bottom surface 10 of base 3 is covered with a skid-resistant rubber covering 11 which prevents movement of frame 1 during a cutting procedure.

The particular construction of base 2 which is shown in the drawings consists of a sheet of wood 12 covered by a laminated sheet of material 13 consisting of bottom and top layers 14 and 15. A rectangular-shaped recess 17 is formed in base 3 and has a depth approximately equal to the thickness of plate 2, which preferably is equal to the thickness of top layer 15 of laminated sheet 13. This enables bottom layer 14 of laminated sheet 13 to form a flat planar platform at the bottom of recess 17 for receivably mounting a plate 2 thereon.

A pair of slots 20 and 21 (FIGS. 7 and 10) are formed in base 3 and extend from their respective end surfaces 8 and 9 inwardly to recess 17 and communicate therewith to facilitate the placement of a plate 2 in recess 17 at the start of a cutting operation, and to facilitate the removal of the smaller plates cut from plate 2 after a cutting operation has been completed. The depths of slots 20 and 21 are such that an individual can place his fingers or an instrument beneath the edges of a plate for removal of the plate or plates from within recess 17 (FIG. 10). A pair of cylindrical-shaped posts 23 and 24 are mounted on top surface 5 of base 3 and extend upwardly therefrom for removably mounting template 4 on base 3. Posts 23 and 24 are mounted generally midway between the adjacent edges of recess 17 and base edges 6 and 7, respectively. The posts preferably are formed of metal and are embedded firmly in base 3 to provide rigid projecting members for removably mounting template 4 thereon.

Template 4 preferably is formed of a clear rigid plastic material to enable the user of cutting frame 1 to view a plate 2 being cut during a cutting operation which facilitates the use of frame 1. Template 4 is formed with a plurality of spaced, linearly extending guide grooves indicated generally at 25, preferably of equal length and width. The lengths of grooves 25 are such that the grooves extend beyond base recess 17 when template 4 is mounted thereon, as shown in FIGS. 2–4.

In further accordance with the invention, a pair of spaced holes 27 and 28 are formed in template 4 and are located at the midpoint of template 4 adjacent the outer ends of the middle guide groove indicated as 25a (FIG. 1). The spacing between holes 27 and 28 is equal to the spacing between base posts 23 and 24. Furthermore, two other pairs of holes, 29 and 30, and 31 and 32, also are formed in template 4 and are spaced between the template edges and the endmost guide grooves, indicated as 25b and 25c, respectively. The spacings between hole pairs 29 and 30 and between 31 and 32 also are equal to the spacing between base posts 23 and 24. The bottoms of template holes 27–32 have conical tapers, as shown in FIGS. 8 and 9, to facilitate the engagement of posts 23 and 24 therewith when mounting template 4 on base 3. Template 4 preferably has a rectangular configuration and is equal in size to base 3, whereby when template 4 is mounted on base 3 in a certain selected position, the edges of base 3 and template 4 will be in alignment with each other, as shown in FIGS. 2 and 4.

One type of plate cutting tool which may be used with cutting frame 1 is shown in FIG. 5 and is indicated generally at 35. Tool 35 includes a handle 36 which is manually held by a user of cutting frame 1 during a cutting operation, which is connected to an elongated flat-sided cutting head 37 having a cutting tip 38 mounted therein. Tip 38 may be an industrial diamond or similar material suitable for cutting glass, plastic or like materials from which main plate 2 may be formed. The particular arrangement and configuration of tool 35 may vary without affecting the concept of the invention.

The details and features of the components of cutting frame 1 and their relationship with each other are set forth in further detail below in describing the operation of cutting frame 1. The operation of cutting frame 1 is as follows. A plate 2 of a certain material is provided having a size and configuration complementary to that of base recess 17. Plate 2 is placed in recess 17 on the supporting platform provided by bottom layer 14. In this position, plate 2 is prevented from any sideways movement due to its engagement with the side walls forming recess 17. Template 4 then is placed on base 3 with posts 23 and 24 being engaged within complementary hole pairs 29 and 30 or 31 and 32. In FIG. 2, posts 23 and 24 are engaged within holes 29 and 30, respectively.

Tool head 37 then is inserted within a selected template groove 25 and is drawn along this selected groove in the "x"-axis or "horizontal" direction to form a linear cut in plate 2. The selected groove or grooves 25 depend upon the particular size plate or plates to be cut from main plate 1. After the preferred horizontal cut or cuts are made in plate 2, template 4 is removed from base 3 by disengagement of posts 23 and 24 from within holes 29 and 30. Template 4 then is rotated 90° to the position of FIG. 4, wherein posts 23 and 24 are engaged in template holes 27 and 28, respectively. In this position, grooves 25 extend in the "y"-axis or "vertical" direction. Tool 35 then is moved along a preselected groove or grooves 25 to form linear cuts in plate 2 which upon crossing or meeting the previously formed horizontal cuts results in one or more smaller rectangular-shaped plates being cut from main plate 2. After the desired number and sizes of smaller plates are cut from main plate 2, template 4 is lifted from base 3 and the smaller plates removed from base recess 17.

In accordance with another of the features of the invention, template 4 can be mounted in a second horizontal cutting position on base 3, as shown in FIG. 3, by engagement of base posts 23 and 24 with template holes 31 and 32, respectively. This enables the spacing between the horizontal cuts to be smaller than the spacing between guide grooves 25. Preferably, the spacing between the template holes 29 and 31 and between holes 30 and 32 is equal to one half of the spacing between the individual guide grooves 25. This enables template 4 to be mounted at a second horizontal plate-cutting position on base 3 to increase the versatility of cutting frame 1. Holes 27–32 are formed in template 4 in such a position whereby the individual holes lie generally on or closely adjacent to the periphery of an imaginary circle inscribed on template 4 having its center at the center of the plate. Holes 27 and 28 are spaced 90° apart with respect to holes 29–32, and holes 29 and 31 are spaced 180° from holes 30 and 32.

The width of guide grooves 25 is complementary to the width of cutting tool head 37, as shown in FIG. 12, so that when tool 35 is moved along a selected guide groove 25, cutting tip 38 cuts a true straight-line cut without any sideways movement or wobble of tool head 37.

As an example, plate cutting frame 1 consists of base 3 having a 30 cm square configuration with recess 17 having a square configuration of 20 cm with a depth of approximately 0.1 cm. Template 4 has the same external dimensions as base 3 and is formed with seven guide grooves 25, each 22 cm long, with the template having a thickness of approximately one quarter inch. These dimensions are for purposes of illustration only as are the particular materials described above from which the base and template may be formed, and should not add any limitations to the invention beyond those required by the prior art.

Improved plate cutting frame 1 provides a device which enables a single main plate 2 to be cut into a snumber of smaller plates, the lengths and widths of which can be varied throughout a wide range by selecting various combinations of horizontally and vertically extending guide grooves by mounting the template in a first position and then in a second position in which the guide grooves are located 90° with respect to said first position, and in which the template may be mounted in a second position in the horizontal cutting direction by the additional pair of template mounting holes to achieve even a greater variety in the number and sizes of plates which may be cut from the main plate.

Accordingly, the cutting frame is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding, but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the plate cutting frame is constructed and used, the characteristics of the construction, and the advantageous, new and useful results obtained; the new and useful structures, devices, elements, arrangements, parts, and combinations are set forth in the appended claims.

We claim:

1. A device for cutting a thin main plate of material into a plurality of smaller size, rectangular-shaped plates, said device including:
   (a) base means for holding a main plate in a fixed position;
   (b) a template removably mounted on the base means and adapted to overlie a main plate when held on the base means;
   (c) a plurality of spaced, parallel, linear guide grooves formed in the template, said grooves being adapted to slidably receive the end of a cutting tool therein for cutting a main plate in a line along a selected guide groove; and
   (d) mounting means formed on the base means and template for mounting the template on the base means in a first cutting position in which the guide grooves extend in a first direction and in a second cutting position in which the guide grooves extend in a second direction transverse to said first direction, whereby a cutting tool when moved along certain selected guide grooves in the template first position and then moved along certain selected guide grooves in the template second position cuts a predetermined sized rectangular-shaped plate from the main plate.

2. The device defined in claim 1 in which the base means is formed with a recess which forms a platform for receivably supporting a main plate of material.

3. The device defined in claim 2 in which the recess has a rectangular configuration with the platform having a planar surface for supporting a main plate.

4. The device as defined in claim 3 in which the depth of the recess is approximately equal to the thickness of a main plate.

5. The device as defined in claim 2 in which slot means is formed in the base means and communicates with the recess for facilitating removal of smaller size plates from said recess.

6. The device defined in claim 1 in which the template is a relatively flat sheet of transparent material.

7. The device defined in claim 1 in which the mounting means includes a plurality of post means mounted on the base means and a plurality of complementary-shaped opening means formed in the template, and in which said post means are engageable in said opening means to removably mount the template on the base means.

8. The device defined in claim 7 in which the post mean includes a pair of posts mounted in a spaced relationship on the base means whereby a main plate will lie between said spaced posts when mounted on the base means; in which the opening means include first and second pairs of spaced holes formed in the template and located about the periphery of the template; and in which the first pair of holes is engageable with the posts when mounting the template in the first cutting position and in which the second pair of holes is engageable with the posts when mounting the template in the second cutting position.

9. The device defined in claim 8 in which the template opening means include a third pair of spaced holes formed in the template closely adjacent the first pair of holes; and in which the third pair of holes is engageable with the posts to mount the template on the base means in a third cutting position.

10. The device defined in claim 9 in which the first and third pairs of template holes are spaced apart a distance equal to one half of the spacing between the template guide grooves.

11. The device defined in claim 8 in which the individual holes of the first and second pairs of template holes lie generally on the periphery of an imaginary circle and are spaced 90° with respect to each other, and in which the holes of each respective pair of holes is spaced 180° apart.

12. The device defined in claim 1 in which a skid-resistant material is mounted on a bottom surface of the base means.

13. The device defined in claim 1 in which the base means includes a rigid rectangular-shaped base member adapted to be placed on a supporting structure; in which said base member has a planar top surface formed with a rectangular-shaped recess for receivably mounting a main plate therein; in which the mounting means includes a pair of posts mounted in the base member and two pairs of complementary-shaped holes formed in the template; in which the individual posts are mounted on opposite sides of the top surface of the base member and are selectively seated in one of the pairs of template holes to mount the template on the base means in either the first or second cutting positions.

14. A device for cutting a thin main plate of material into a plurality of rectangular-shaped plates, said device including:
 (a) a base adapted to support a main plate thereon;
 (b) a template engageable with the base and adapted to overlie a main plate when supported on the base;
 (c) a plurality of spaced, parallel, linear guide grooves formed in the template, said grooves being adapted to slidably receive the end of a cutting tool therein for cutting a plurality of spaced, parallel linear lines in the main plate by movement of the cutting tool along a plurality of selected guide grooves; and
 (d) mounting means engageable with the base and template for mounting the template on the base in a first cutting position in which the guide grooves extend in a first direction and for mounting the template on the base in a second cutting position in which the template is rotated 90° from the first cutting position whereby the guide grooves extend in a second direction transverse to said first direction, so that a cutting tool when moved along certain selected guide grooves in the template first position and then moved along certain selected guide grooves in the template second position cuts a plurality of predetermined sized rectangular-shaped plates from the main plate.

* * * * *